(12) United States Patent
Kelley et al.

(10) Patent No.: US 10,390,474 B2
(45) Date of Patent: Aug. 27, 2019

(54) PATH PLANNING SYSTEM FOR A WORK VEHICLE

(71) Applicants: CNH Industrial America LLC, New Holland, PA (US); Autonomous Solutions, Inc., Mendon, UT (US)

(72) Inventors: John Joseph Kelley, Palatine, IL (US); Nathan Eric Bunderson, Providence, UT (US); Daniel John Morwood, Petersboro, UT (US)

(73) Assignees: CNH Industrial America LLC., New Holland, PA (US); Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 15/627,303

(22) Filed: Jun. 19, 2017

(65) Prior Publication Data
US 2018/0359907 A1   Dec. 20, 2018

(51) Int. Cl.
| | |
|---|---|
| *G01S 19/00* | (2010.01) |
| *G05D 3/00* | (2006.01) |
| *G05D 1/00* | (2006.01) |
| *G01C 21/00* | (2006.01) |
| *G01C 21/20* | (2006.01) |
| *A01B 69/04* | (2006.01) |
| *G05D 1/02* | (2006.01) |

(52) U.S. Cl.
CPC ......... *A01B 69/008* (2013.01); *G05D 1/0214* (2013.01); *G05D 1/0219* (2013.01); *G05D 1/0223* (2013.01); *G05D 1/0274* (2013.01); *G05D 2201/0201* (2013.01)

(58) Field of Classification Search
CPC .. G05D 1/0214; G05D 1/0219; G05D 1/0223; G05D 1/0274
See application file for complete search history.

(56) References Cited

U.S. PATENT DOCUMENTS

| | | | |
|---|---|---|---|
| 4,949,277 A | 8/1990 | Trovato et al. | |
| 6,173,219 B1 * | 1/2001 | Deker ................... | G01C 21/00 244/76 R |
| 6,278,907 B1 | 8/2001 | Fromherz et al. | |

(Continued)

OTHER PUBLICATIONS

Scheuer et al., "Continuous-Curvature Path Planning for Car-Like Vehicles," Intelligent Robots and Systems, 1997, 8 pgs, IEEE, Grenoble, France.

(Continued)

*Primary Examiner* — Adam D Tissot
(74) *Attorney, Agent, or Firm* — Rebecca L. Henkel; Rickard K. DeMille

(57) ABSTRACT

A path planning system for a work vehicle includes a controller configured to determine an initial path between an end point of a first swath and a starting point of a second swath. In addition, the controller is configured to identify a restricted region positioned along the initial path and to determine, in response to identifying the restricted region positioned along the initial path, a first bounding point of the restricted region. Furthermore, the controller is configured to determine a first waypoint based on the first bounding point and to determine an updated path that intersects the first waypoint. The controller is also configured to output signal(s) indicative of the updated path and/or instructions to direct the work vehicle along the updated path.

17 Claims, 5 Drawing Sheets

(56) References Cited

U.S. PATENT DOCUMENTS

| | | |
|---|---|---|
| 6,621,452 B2 | 9/2003 | Knockeart et al. |
| 7,010,425 B2 | 3/2006 | Gray et al. |
| 7,110,881 B2 | 9/2006 | Gray et al. |
| 7,344,288 B2 | 3/2008 | Kobayashi et al. |
| 7,860,628 B2 * | 12/2010 | Lange ................. A01B 69/008 342/357.2 |
| 8,060,306 B2 | 11/2011 | Puhalla et al. |
| 8,126,642 B2 | 2/2012 | Trepagnier et al. |
| 8,131,432 B2 * | 3/2012 | Senneff ............... A01B 69/007 701/23 |
| 8,160,613 B2 | 4/2012 | Handforth et al. |
| 8,571,742 B2 | 10/2013 | Takeoka |
| 8,849,494 B1 | 9/2014 | Herback et al. |
| 9,174,672 B2 | 11/2015 | Zeng et al. |
| 9,612,128 B2 | 4/2017 | Delling et al. |
| 2002/0183922 A1 * | 12/2002 | Tomasi ................. G01C 21/20 701/533 |
| 2006/0106534 A1 | 5/2006 | Kawamata et al. |
| 2010/0023251 A1 | 1/2010 | Gale et al. |

OTHER PUBLICATIONS

U.S. Appl. No. 15/627,353, filed Jun. 19, 2017, John Joseph Kelley.

* cited by examiner

PATH PLANNING SYSTEM FOR A WORK VEHICLE

BACKGROUND

The disclosure relates generally to a path planning system for a work vehicle.

Certain autonomous work vehicles are configured to traverse portions of a field without operator input. For example, an autonomous work vehicle may be configured to move an implement along swaths through an agricultural field to enable the implement to perform an agricultural operation (e.g., a planting operation, a seeding operation, a harvesting operation, a tilling operation, a spraying operation, etc.) on the swaths. The swaths may extend along parallel paths through the agricultural field, and the autonomous work vehicle may be turned at headlands to transition between swaths. The autonomous work vehicle may be automatically controlled while traversing the swaths. However, due to obstacles (e.g., fences, building, etc.) within the headlands, the autonomous work vehicle may be manually controlled during the headland turns to avoid the obstacles. Unfortunately, manually controlling the work vehicle may reduce the efficiency of the agricultural operation (e.g., because the operator may direct the work vehicle along an inefficient path between swaths).

BRIEF DESCRIPTION

In one embodiment, a path planning system for a work vehicle of a work vehicle system includes at least one controller having memory and processor(s). The controller(s) are configured to determine an initial path between an end point of a first swath and a starting point of a second swath. In addition, the controller(s) are configured to identify a restricted region positioned along the initial path and, in response, to determine a first bounding point of the restricted region. The first bounding point corresponds to a location on a boundary of the restricted region having a maximum lateral distance from a first reference line segment, and the first reference line segment connects a first intersection point between the initial path and the boundary of the restricted region to a second intersection point between the initial path and the boundary of the restricted region. Furthermore, the controller(s) are configured to determine a first waypoint based on the first bounding point and to determine an updated path that intersects the first waypoint. The controller(s) are also configured to output one or more signals indicative of the updated path and/or instructions to direct the work vehicle along the updated path.

In another embodiment, one or more tangible, non-transitory, machine-readable media include instructions configured to cause a processor to determine an initial path between an end point of a first swath and a starting point of a second swath. The instructions are also configured to cause the processor to identify a restricted region positioned along the initial path and to determine, in response to identifying the restricted region positioned along the initial path, a first bounding point of the restricted region. The first bounding point corresponds to a location on a boundary of the restricted region having a maximum lateral distance from a first reference line segment, and the first reference line segment connects a first intersection point between the initial path and the boundary of the restricted region to a second intersection point between the initial path and the boundary of the restricted region. In addition, the instructions are configured to cause the processor to determine a first waypoint based on the first bounding point and to determine an updated path that intersects the first waypoint. The instructions are also configured to cause the processor to output one or more signals indicative of the updated path and/or instructions to direct a work vehicle of a work vehicle system along the updated path.

In a further embodiment, a method for planning a path for a work vehicle of a work vehicle system includes determining, via at least one controller, an initial path between an end point of a first swath and a starting point of a second swath. The method also includes identifying, via the controller(s), a restricted region positioned along the initial path and determining, via the controller(s), a first bounding point of the restricted region in response to identifying the restricted region positioned along the initial path. The first bounding point corresponds to a location on a boundary of the restricted region having a maximum lateral distance from a first reference line segment, and the first reference line segment connects a first intersection point between the initial path and the boundary of the restricted region to a second intersection point between the initial path and the boundary of the restricted region. In addition, the method includes determining, via the controller(s), a first waypoint based on the first bounding point and determining, via the controller(s), an updated path that intersects the first waypoint. The method also includes outputting, via the controller(s), one or more signals indicative of the updated path and/or instructions to direct the work vehicle along the updated path.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
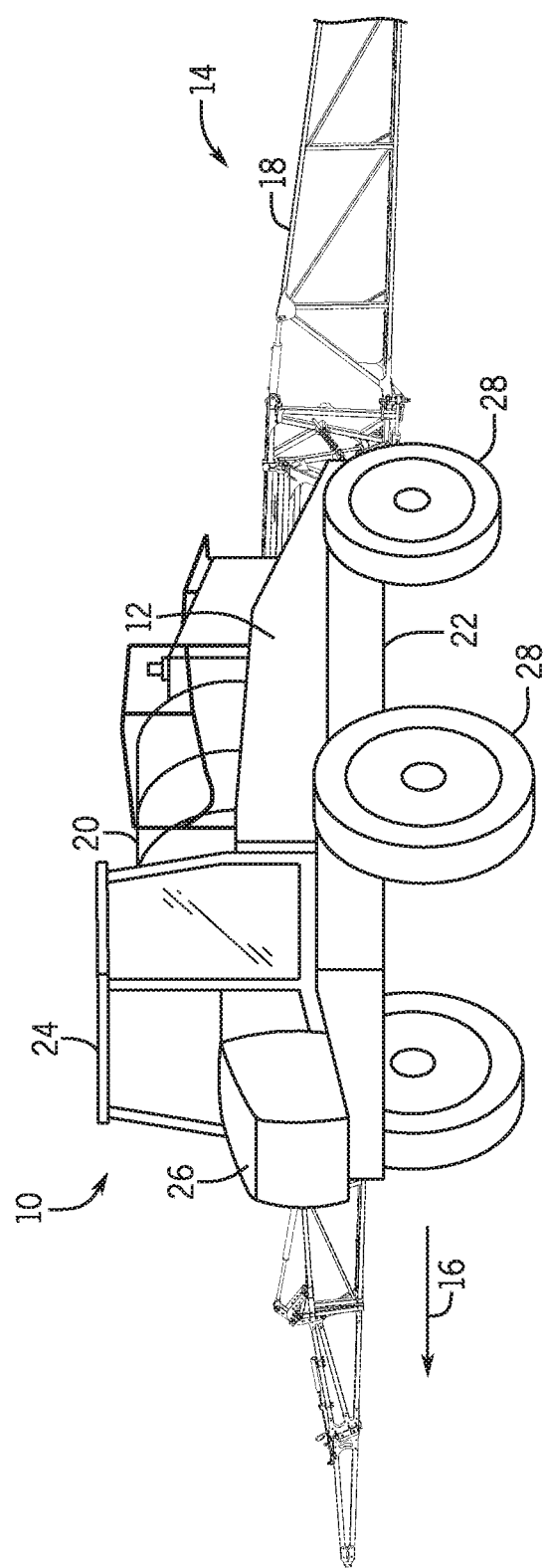
FIG. 1 is a perspective view of an embodiment of an autonomous work vehicle system including an autonomous work vehicle and an agricultural implement coupled to the autonomous work vehicle.

Turning now to the drawings, FIG. 1 is a perspective view of an embodiment of an autonomous work vehicle system 10 including an autonomous work vehicle 12 and an agricultural implement 14 coupled to the autonomous work vehicle 12. The autonomous work vehicle 12 includes a control system configured to automatically guide the autonomous work vehicle system 10 through a field (e.g., along a direction of travel 16) to facilitate agricultural operations (e.g., spraying operations, planting operations, seeding operations, application operations, tillage operations, harvesting operations, etc.). For example, the control system may automatically guide the autonomous work vehicle system 10 along a route through the field without input from an operator. The control system may also automatically guide the autonomous work vehicle system 10 around headland turns between segments of the route (e.g., swaths).

In the illustrated embodiment, the agricultural implement 14 is a sprayer assembly having a boom 18 and multiple spray heads distributed along the boom. In addition, the autonomous work vehicle 12 includes a tank 20 configured to store liquid product, such as fertilizer, herbicide, other products, or a combination thereof, for distribution to the spray heads. The spray heads are configured to receive the product from the tank 20 and to apply the product to the field.

As illustrated, the autonomous work vehicle 12 also includes a frame 22, a cab 24, and a hood 26. The frame 22 provides structural support for the cab 24, the hood 26, and the tank 20. Furthermore, the cab 24 provides an enclosed space for an operator, and the hood 26 houses the engine and/or other systems configured to facilitate operation of the autonomous work vehicle 12. The autonomous work vehicle 12 also includes wheels 28 configured to support the frame 22, and to facilitate movement of the autonomous work vehicle 12 across the field. While a sprayer assembly is coupled to the autonomous work vehicle 12 in the illustrated embodiment, other agricultural implements may be coupled to the autonomous work vehicle in other embodiments. For example, in certain embodiments, a seeder, an air cart, a mower, a tillage tool, or a combination thereof, among other suitable agricultural implements, may be coupled to (e.g., towed by, supported by, etc.) the autonomous work vehicle.

In certain embodiments, the autonomous work vehicle 12 includes a path planning system/control system configured to automatically determine a path between an end point of a first swath and a starting point of a second swath, and to instruct a movement control system of the work vehicle to direct the work vehicle along the path. As discussed in detail below, the path planning system includes at least one controller configured to determine an initial path between the end point of the first swath and the starting point of the second swath. The controller(s) are also configured to identify a restricted region positioned along the initial path. In addition, the controller(s) are configured to determine a bounding point of the restricted region in response to identifying the restricted region positioned along the initial path. The bounding point corresponds to a location on a boundary of the restricted region having a maximum lateral distance from a reference line segment, and the reference line segment connects a first intersection point between the initial path and the boundary of the restricted region to a second intersection point between the initial path and the boundary of the restricted region. Furthermore, the controller(s) are configured to determine a waypoint based on the bounding point, and to determine an updated path that intersects the waypoint. The controller(s) are also configured to instruct the movement control system to direct the work vehicle along the updated path. Because the path control system is configured to determine a path that causes the work vehicle system to avoid the restricted region, the work vehicle may be automatically controlled through a headland turn, thereby increasing the efficiency of agricultural operations (e.g., as compared to manually controlling the work vehicle through the headland turn).

Figure 2:
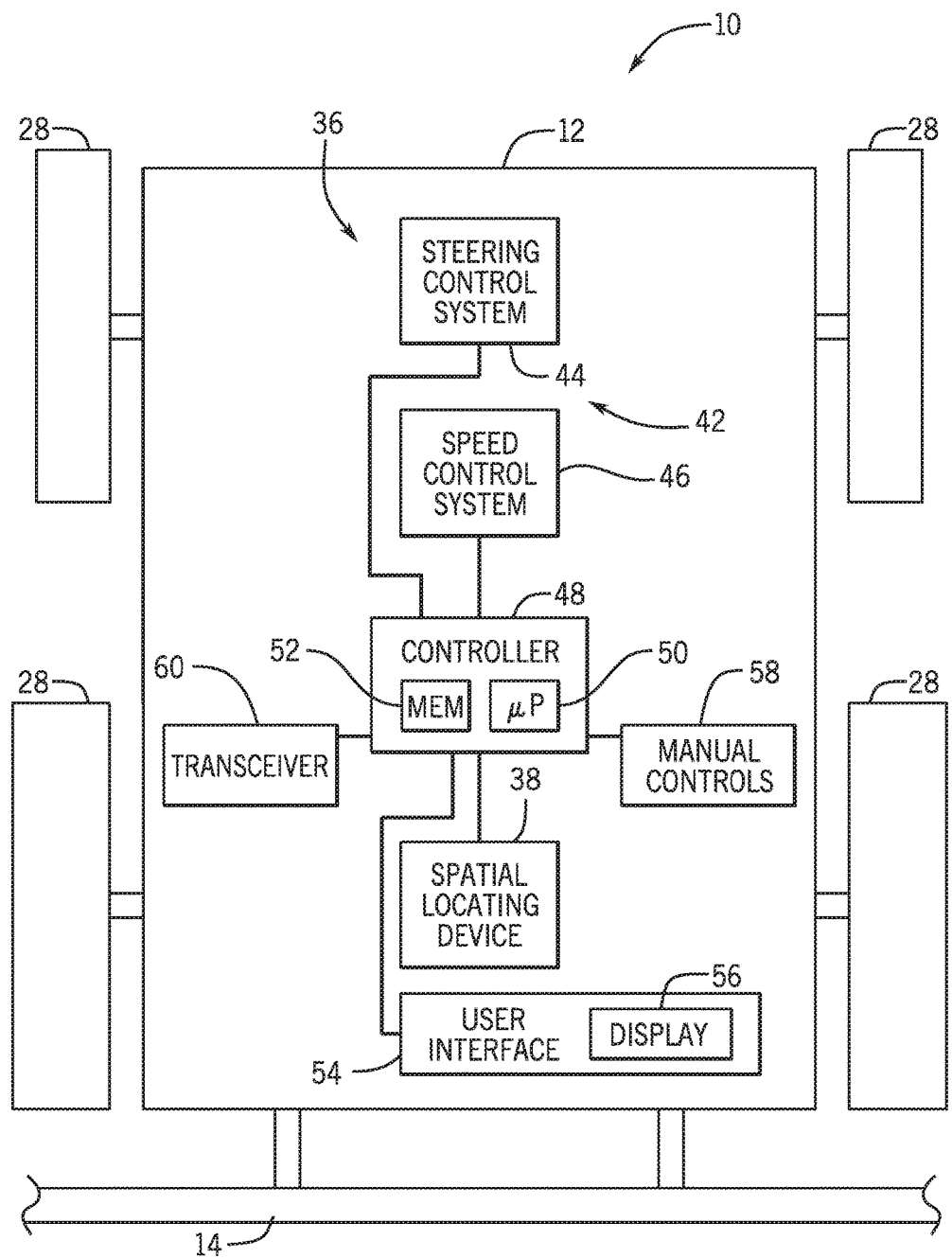
FIG. 2 is a block diagram of an embodiment of a control system that may be employed within the autonomous work vehicle system of FIG. 1.

FIG. 2 is a block diagram of an embodiment of a control system 36 (e.g., path planning system) that may be employed within the autonomous work vehicle system 10 of FIG. 1. In the illustrated embodiment, the control system 36 includes a spatial locating device 38, which is mounted to the autonomous work vehicle 12 and configured to determine a position and, in certain embodiments, a velocity of the autonomous work vehicle 12. The spatial locating device 38 may include any suitable system configured to measure and/or determine the position of the autonomous work vehicle 12, such as a GPS receiver, for example.

In the illustrated embodiment, the control system 36 includes a movement control system 42 having a steering control system 44 configured to control a direction of movement of the autonomous work vehicle 12, and the movement control system 42 may include a speed control system 46 configured to control a speed of the autonomous work vehicle 12. In addition, the control system 36 includes a controller 48, which is communicatively coupled to the spatial locating device 38, to the steering control system 44, and to the speed control system 46. The controller 48 is configured to automatically control the autonomous work vehicle at least during certain phases of agricultural operations (e.g., without operator input, with limited operator input, etc.).

In certain embodiments, the controller 48 is an electronic controller having electrical circuitry configured to process data from the spatial locating device 38 and/or other components of the control system 36. In the illustrated embodiment, the controller 48 include a processor, such as the illustrated microprocessor 50, and a memory device 52. The controller 48 may also include one or more storage devices and/or other suitable components. The processor 50 may be used to execute software, such as software for controlling the autonomous work vehicle, software for determining a position of an obstacle, and so forth. Moreover, the processor 50 may include multiple microprocessors, one or more "general-purpose" microprocessors, one or more special-purpose microprocessors, and/or one or more application specific integrated circuits (ASICS), or some combination thereof. For example, the processor 50 may include one or more reduced instruction set (RISC) processors.

The memory device 52 may include a volatile memory, such as random access memory (RAM), and/or a nonvolatile memory, such as read-only memory (ROM). The memory device 52 may store a variety of information and may be used for various purposes. For example, the memory device 52 may store processor-executable instructions (e.g., firmware or software) for the processor 50 to execute, such as instructions for controlling the autonomous work vehicle, instructions for planning a path of the autonomous work vehicle, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, vehicle geometry data, etc.), instructions (e.g., software or firmware for controlling the autonomous work vehicle, etc.), and any other suitable data.

In certain embodiments, the steering control system 44 may include a wheel angle control system, a differential braking system, a torque vectoring system, or a combination thereof. The wheel angle control system may automatically rotate one or more wheels and/or tracks of the autonomous work vehicle (e.g., via hydraulic actuators) to steer the autonomous work vehicle along a target route (e.g., along a guidance swath, along headline turns, etc.). By way of example, the wheel angle control system may rotate front wheels/tracks, rear wheels/tracks, intermediate wheels/tracks, or a combination thereof, of the autonomous work vehicle (e.g., either individually or in groups). The differential braking system may independently vary the braking force on each lateral side of the autonomous work vehicle to direct the autonomous work vehicle along a path. In addition, the torque vectoring system may differentially apply torque from an engine to wheel(s) and/or track(s) on each lateral side of the autonomous work vehicle, thereby directing the autonomous work vehicle along a path. In further embodiments, the steering control system may include other and/or additional systems to facilitate directing the autonomous work vehicle along a path through the field.

In certain embodiments, the speed control system 46 may include an engine output control system, a transmission control system, a braking control system, or a combination thereof. The engine output control system may vary the output of the engine to control the speed of the autonomous work vehicle. For example, the engine output control system may vary a throttle setting of the engine, a fuel/air mixture of the engine, a timing of the engine, other suitable engine parameters to control engine output, or a combination thereof. In addition, the transmission control system may adjust a gear ratio of a transmission (e.g., by adjusting gear selection in a transmission with discrete gears, by controlling a continuously variable transmission (CVT), etc.) to control the speed of the autonomous work vehicle. Furthermore, the braking control system may adjust braking force, thereby controlling the speed of the autonomous work vehicle. In further embodiments, the speed control system may include other and/or additional systems to facilitate adjusting the speed of the autonomous work vehicle.

In certain embodiments, the control system may also control operation of the agricultural implement coupled to the autonomous work vehicle. For example, the control system may include an implement control system/implement controller configured to control a steering angle of the implement (e.g., via an implement steering control system having a wheel angle control system and/or a differential braking system) and/or a speed of the autonomous work vehicle system (e.g., via an implement speed control system having a braking control system). In such embodiments, the autonomous work vehicle control system may be communicatively coupled to a control system/controller on the implement via a communication network, such as a controller area network (CAN bus).

In the illustrated embodiment, the control system 36 includes a user interface 54 communicatively coupled to the controller 48. The user interface 54 is configured to enable an operator to control certain parameter(s) associated with operation of the autonomous work vehicle. For example, the user interface 54 may include a switch that enables the operator to selectively configure the autonomous work vehicle for autonomous or manual operation. In addition, the user interface 54 may include a battery cut-off switch, an engine ignition switch, a stop button, or a combination thereof, among other controls. In certain embodiments, the user interface 54 includes a display 56 configured to present information to the operator, such as a graphical representation of a swath, a visual representation of certain parameter(s) associated with operation of the autonomous work vehicle (e.g., fuel level, oil pressure, water temperature, etc.), a visual representation of certain parameter(s) associated with operation of the agricultural implement coupled to the autonomous work vehicle (e.g., product flow rate, product quantity remaining in tank, penetration depth of ground engaging tools, orientation(s)/position(s) of certain components of the implement, etc.), or a combination thereof, among other information. In certain embodiments, the display 56 may include a touch screen interface that enables the operator to control certain parameters associated with operation of the autonomous work vehicle and/or the agricultural implement.

In the illustrated embodiment, the control system 36 includes manual controls 58 configured to enable an operator to control the autonomous work vehicle while automatic control is disengaged (e.g., while unloading the autonomous work vehicle from a trailer, etc.). The manual controls 58 may include manual steering control, manual transmission control, manual braking control, or a combination thereof, among other controls. In the illustrated embodiment, the manual controls 58 are communicatively coupled to the controller 48. The controller 48 is configured to disengage automatic control of the autonomous work vehicle upon receiving a signal indicative of manual control of the autonomous work vehicle. Accordingly, if an operator controls the autonomous work vehicle manually, the automatic control terminates, thereby enabling the operator to control the autonomous work vehicle.

In the illustrated embodiment, the control system 36 includes a transceiver 60 communicatively coupled to the controller 48. In certain embodiments, the transceiver 60 is configured to establish a communication link with a corresponding transceiver of a base station, thereby facilitating communication between the base station and the control system of the autonomous work vehicle. For example, the base station may include a user interface that enables a remote operator to provide instructions to the control system (e.g., instructions to initiate automatic control of the autonomous work vehicle, instructions to direct the autonomous work vehicle along a route, etc.). The user interface may also enable a remote operator to provide data to the control system. The transceiver 60 may operate at any suitable frequency range within the electromagnetic spectrum. For example, in certain embodiments, the transceiver 60 may broadcast and receive radio waves within a frequency range of about 1 GHz to about 10 GHz. In addition, the transceiver 60 may utilize any suitable communication protocol, such as a standard protocol (e.g., Wi-Fi, Bluetooth, etc.) or a proprietary protocol.

In certain embodiments, the control system may include other and/or additional controllers/control systems, such as the implement controller/control system discussed above. For example, the implement controller/control system may be configured to control various parameters of an agricultural implement towed by the autonomous work vehicle. In certain embodiments, the implement controller/control system may be configured to instruct one or more valves to control product flow to the spray heads of the sprayer assembly. Furthermore, the implement controller/control system may instruct actuator(s) to transition the agricultural implement between a working position and a transport portion, to control a penetration depth of a ground engaging tool, or to adjust a position of a header of the agricultural implement (e.g., a harvester, etc.), among other operations. The autonomous work vehicle control system may also include controller(s)/control system(s) for electrohydraulic remote(s), power take-off shaft(s), adjustable hitch(es), or a combination thereof, among other controllers/control systems.

In certain embodiments, the controller 48 is configured to direct the autonomous work vehicle 12 along multiple swaths through a field. In addition, the controller is configured to plan a path between swaths and to direct the work vehicle along the planned path. In certain embodiments, the controller 48 is configured to determine an initial path of the work vehicle 12 between an end point of a first swath and a starting point of a second swath. The controller 48 is also configured to identify a restricted region positioned along the initial path. In addition, the controller 48 is configured to determine a bounding point of the restricted region in response to identifying the restricted region positioned along the initial path. The bounding point corresponds to a location on a boundary of the restricted region having a maximum lateral distance from a reference line segment, and the reference line segment connects a first intersection point between the initial path and the boundary of the restricted region to a second intersection point between the initial path and the boundary of the restricted region. Furthermore, the controller 48 is configured to determine a waypoint based on the bounding point, and to determine an updated path that intersects the waypoint. The controller 48 is also configured to output one or more signals indicative of instructions to direct the work vehicle 12 along the updated path. For example, the controller 48 may be configured to output one or more signals to the movement control system 42 indicative of instructions to direct the work vehicle 12 along the updated path. Because the controller is configured to determine a path that causes the work vehicle system to avoid the restricted region, the work vehicle may be automatically controlled through a headland turn, thereby increasing the efficiency of agricultural operations (e.g., as compared to manually controlling the work vehicle through the headland turn).

While the autonomous work vehicle controller plans the path between swaths and outputs one or more signals indicative of instructions to direct the work vehicle along the planned path in the illustrated embodiment, in alternative embodiments, the path between swaths may be planned and/or one or more signals (e.g., indicative of the path and/or instructions to direct the work vehicle along the path) may be output by one or more other controllers. For example, in certain embodiments, a base station controller may determine the path between swaths and output one or more signals indicative of the path to the work vehicle controller (e.g., via respective transceivers). The work vehicle controller may then instruct the movement control system to direct the work vehicle along the planned path. In further embodiments, the base station controller may determine the path between swaths and output one or more signals (e.g., via respective transceivers, via the autonomous work vehicle controller, etc.) indicative of instructions to direct the work vehicle along the planned path.

Figure 3:
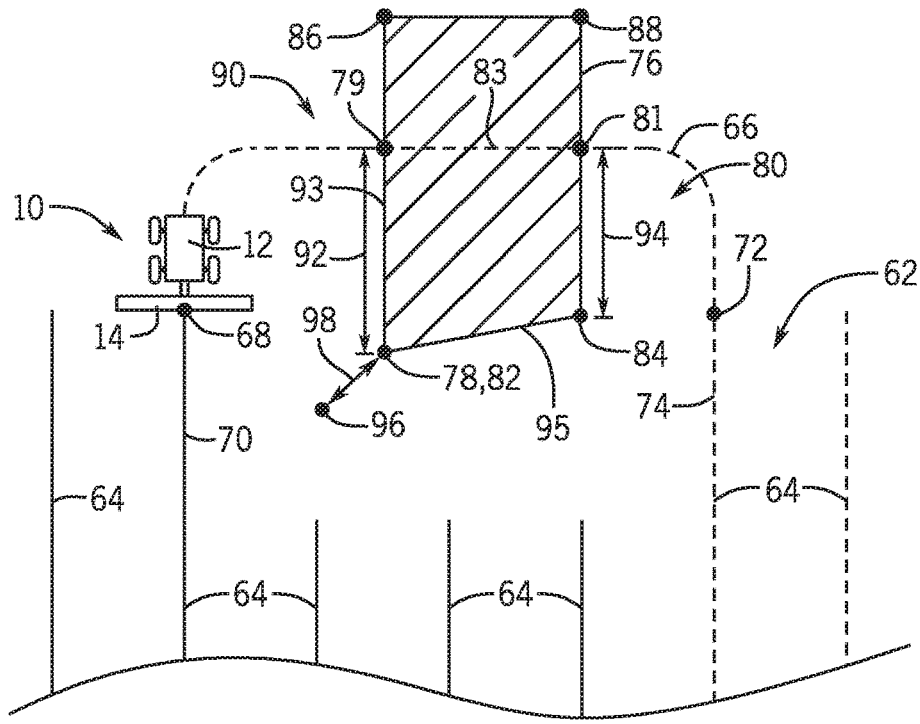
FIG. 3 is a schematic diagram of an embodiment of the autonomous work vehicle system within a field, in which an initial path connects an end point of a first swath with a starting point of a second swath.

FIG. 3 is a schematic diagram of an embodiment of the autonomous work vehicle system 10 within a field 62, in which an initial path connects an end point of a first swath with a starting point of a second swath. In the illustrated embodiment, the work vehicle system 10 is configured to perform an agricultural operation (e.g., a spraying operation, a tilling operation, a seeding operation, a planting operation, a harvesting operation, etc.) on the agricultural field 62. Accordingly, the work vehicle 12 is configured to move the implement 14 through the field 62 along multiple swaths 64. The position, orientation, and length of each swath 64 may be determined by a route planning system (e.g., including the vehicle controller, a base station controller, or a combination thereof). The route planning system may establish swaths that cover a substantial portion of the field 62, and the work vehicle controller may direct the work vehicle along each of the swaths (e.g., by outputting instructions to the movement control system of the work vehicle). As illustrated, the solid lines represent swaths 64 that have been traversed by the work vehicle system 10, and the dashed lines represent swaths 64 that have been established but not traversed.

In the illustrated embodiment, a controller (e.g., the work vehicle controller) of a path planning system is configured to determine an initial path 66 between an end point 68 of a first swath 70 and a starting point 72 of a second swath 74. For example, the controller may determine the initial path 66 by establishing a clothoid curve that extends through the end point 68 of the first swath 70 and the starting point 72 of the second swath 74. The initial path may be continuous or substantially continuous, and the initial path may be based on the capabilities of the work vehicle system (e.g., minimum turn radius, etc.). As illustrated, the initial path 66 extends through a restricted region 76 of the field 62. The restricted region 76 represents a portion of the field to be avoided by the work vehicle system 10. For example, the restricted region 76 may correspond to an area of the field having rough terrain, a fence or other boundary within the field, or a building, among other objects/field conditions. The restricted region may also correspond to a portion of the field covered by the swaths 64 (e.g., a portion of the field covered by crops, a tilled portion of the field, etc.). The position and shape of the restricted region may be stored in the memory device of the controller. For example, the restricted region may be represented as a series of vertices connected by line segments, and the position of each vertex may be stored in the memory device of the controller.

If the restricted region 76 is positioned along the initial path 66, the controller is configured to identify the restricted region 76. For example, the controller may compare the track of the initial path 66 (e.g., the area swept by the work vehicle system along the initial path) to the area covered by the restricted region 76, and the controller may identify the restricted region 76 positioned along the initial path 66 based on an intersection of the track of the initial path 66 and the restricted region 76. If the controller does not identify a restricted region within the initial path of the work vehicle system, the controller may instruct the movement control system of the work vehicle to direct the work vehicle along the initial path, and/or the controller may output one or more signals indicative of the path (e.g., to another controller configured to provide instructions to direct the work vehicle along the initial path).

In response to identifying the restricted region 76 along the initial path, the controller determines a first bounding point 78 of the restricted region 76. The first bounding point corresponds to a location on the boundary of the restricted region 76 having a maximum lateral distance the from a first reference line segment 83, and the first reference line segment 83 connects a first intersection point 79 between the initial path 66 and the boundary of the restricted region 76 to a second intersection point 81 between the initial path 66 and the boundary of the restricted region 76. In the illustrated embodiment, the boundary of the restricted region is formed from multiple vertices connected by line segments. Accordingly, the first bounding point 78 corresponds to one vertex of the restricted region vertices having a maximum lateral distance from the first reference line segment 83. In certain embodiments, the bounding point may only be selected from boundary locations (e.g., vertices) on the same side of the first reference line segment 83 as the first swath 70 and the second swath 74. As illustrated, the first swath 70 and the second swath 74 are positioned on a first side 80 of the first reference line segment 83, and a first vertex 82 and a second vertex 84 of the restricted region vertices are positioned on the first side 80 of the first reference line segment 83. In addition, a third vertex 86 and a fourth vertex 88 are positioned on a second side 90 of the first reference line segment 83. Accordingly, to establish an updated path extending along the swath side of the restricted region 76, one of the vertices on the first side 80 of the first reference line segment 83 may be selected as the bounding point (e.g., the third and fourth vertices may be excluded from the candidate vertices). In addition, to establish an updated path extending around the restricted region 76, one of the vertices on the second side 90 of the first reference line segment 83 may be selected as the bounding point (e.g., the first and second vertices may be excluded from the candidate vertices). In the illustrated embodiment, because the distance between the restricted region 76 and the swaths 64 is sufficient to enable the work vehicle system to move through a region between the restricted region 76 and the swaths 64, the first bounding point is selected from one of the boundary locations (e.g., vertices) on the first side 80 of the first reference line segment 83. However, if the distance between the restricted region and the swaths were insufficient to facilitate passage of the work vehicle system through the region between the restricted region and the swaths, the first bounding point may be selected from one of the boundary locations (e.g., vertices) on the second side 90 of the first reference line segment 83.

As illustrated, the first vertex 82 is positioned a first lateral distance 92 from the first reference line segment 83, and the second vertex 84 is positioned a second lateral distance 94 from the first reference line segment 83. As used herein, "lateral distance" refers to the distance away from a path/line segment along a lateral axis that extends perpendicularly to the path/line segment. In the illustrated embodiment, the first lateral distance 92 is greater than the second lateral distance 94. Accordingly, the first vertex 82 is selected as the first bounding point 78.

Once the first bounding point 78 is determined, the controller determines a first waypoint 96 based on the first bounding point 78. In the illustrated embodiment, the first waypoint 96 is positioned outwardly from the bounding point 78 relative to the first reference line segment 83. For example, the first waypoint 96 may be positioned along a line that bisects an angle between a first line segment 93, which extends between the first vertex 82 and the third vertex 86, and a second line segment 95, which extends between the first vertex 82 and the second vertex 84. In the illustrated embodiment, a distance 98 between the first bounding point 78 and the first waypoint 96 is greater than or equal to half of a lateral extent of the work vehicle system (e.g., the maximum extent of the work vehicle system along a lateral axis of the work vehicle system). Accordingly, while the work vehicle system is positioned at the first waypoint 96, the work vehicle system does not overlap the restricted region 76. While the first waypoint 96 is laterally and longitudinally offset from the first bounding point 78, the first waypoint may be positioned in other suitable locations in alternative embodiments. For example, the first waypoint may be only laterally offset from the first bounding point, or the first waypoint may be only longitudinally offset from the first bounding point. Once the first waypoint 96 is determined, the controller determines an updated path (e.g., first updated path) that intersects the first waypoint 96. For example, the controller may determine the updated path by establishing a clothoid curve that extends through the end point 68 of the first swath 70, the starting point 72 of the second swath 74, and the first waypoint 96. The updated path may be continuous or substantially continuous, and the updated path may be based on the capabilities of the work vehicle system (e.g., minimum turn radius, etc.).

As used herein with regard to points (e.g., waypoints), "intersect" and "extend through" refer to a path that directly intersects a point or passes within a threshold range of the point. The threshold range may be selected based on the technique used to establish the path (e.g., establishing a clothoid curve, etc.).

Figure 4:
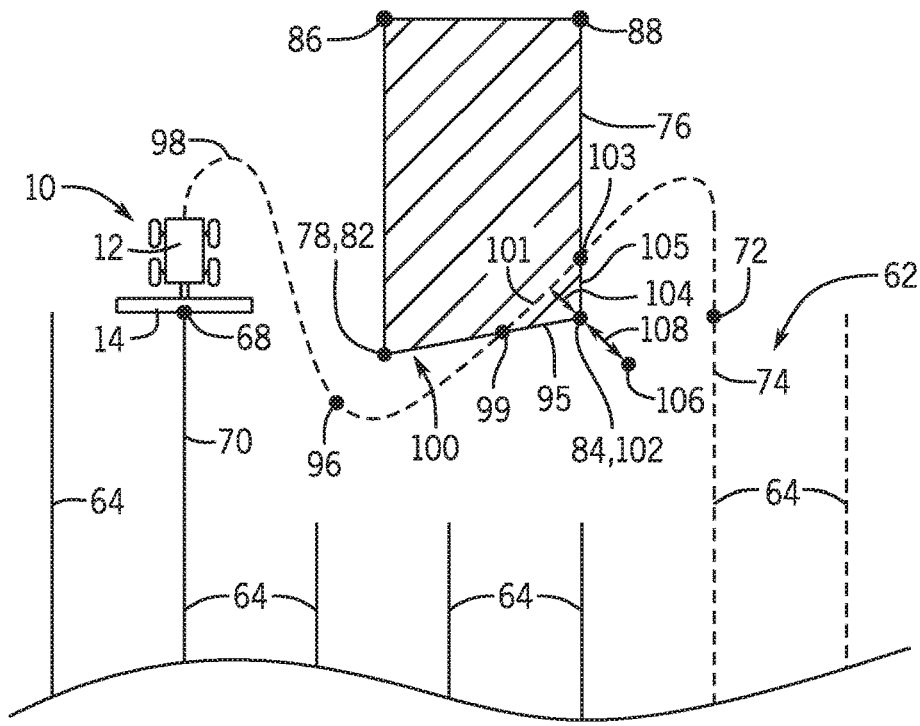
FIG. 4 is a schematic diagram of the autonomous work vehicle system of FIG. 3 within the field, in which a first updated path causes the autonomous work vehicle system to avoid a first portion of a restricted region.

FIG. 4 is a schematic diagram of the autonomous work vehicle system 10 of FIG. 3 within the field 62, in which a first updated path 98 (e.g., updated path) causes the autonomous work vehicle system 10 to avoid a first portion 100 of the restricted region 76. As illustrated, the first updated path 98 intersects the first waypoint 96, thereby positioning the first updated path 98 a sufficient distance from the first bounding point 78 to enable the work vehicle system 10 to avoid the restricted region 76 at the first bounding point 78. If the controller does not identify any portion of the restricted region within the first updated path of the work vehicle system, the controller may instruct the movement control system of the work vehicle to direct the work vehicle along the first updated path, and/or the controller may output one or more signals indicative of the first updated path (e.g., to another controller configured to provide instructions to direct the work vehicle along the first updated path). However, if another portion of the restricted region 76 is positioned along the first updated path 98, as illustrated, the controller is configured to identify the restricted region 76. For example, the controller may compare the track of the first updated path 98 (e.g., the area swept by the work vehicle system along the first updated path) to the area covered by the restricted region 76, and the controller may identify the restricted region 76 positioned along the first updated path 98 based on an intersection of the track of the first updated path 98 and the restricted region 76.

In response to identifying the restricted region 76 along the first updated path, the controller determines a second bounding point 102 of the restricted region 76. The second bounding point corresponds to a location on the boundary of the restricted region 76 having a maximum lateral distance from a second reference line segment 101, and the second reference line segment 101 connects a first intersection point 99 between the first updated path 98 and the boundary of the restricted region 76 to a second intersection point 103 between the first updated path 98 and the boundary of the restricted region 76. In the illustrated embodiment, the boundary of the restricted region is formed from multiple vertices connected by line segments. Accordingly, the second bounding point 102 corresponds to one vertex of the restricted region vertices having a maximum lateral distance from the second reference line segment 101. In certain embodiments, the second bounding point may only be selected from boundary locations on the same side of the first reference line segment as the first swath 70 and the second swath 74. For example, the second bounding point may only be selected from the set of vertices from which the first bounding point 78 is selected. As previously discussed, the first bounding point 78 is selected from the set of vertices consisting of the first vertex 82 and the second vertex 84. Accordingly, the second bounding point 102 may be selected from the same set of vertices (e.g., the first vertex 82 and the second vertex 84). In addition, the boundary location (e.g., vertex) corresponding to the first bounding point may be excluded from the candidate boundary locations (e.g., set of vertices from which the first bounding point is selected) because the first updated path already causes the autonomous work vehicle system to avoid the restricted region 76 at the first bounding point 78. Therefore, in the illustrated embodiment, the second vertex 84 is selected as the second bounding point 102. However, if the restricted region 76 included additional vertices within the set of vertices from which the first bounding point is selected, the lateral distance 104 of the second vertex 84 from the second reference line segment 101 would be compared to the lateral distance(s) of one or more other vertices, and the vertex having the greatest lateral distance from the second reference line segment would be selected as the second bounding point.

In further embodiments, the second bounding point may be selected from another set of boundary locations (e.g., vertices). For example, the second bounding point may be selected from the set of boundary locations (e.g., vertices) on the same side of the second reference line segment 101 as the swath 64. In further embodiments, the second bound point may be selected from all of the boundary locations (e.g., vertices) of the restricted region.

Once the second bounding point 102 is determined, the controller determines a second waypoint 106 based on the second bounding point 102. In the illustrated embodiment, the second waypoint 106 is positioned outwardly from the second bounding point 102 relative to the second reference line segment 101. For example, the second waypoint 106 may be positioned along a line that bisects an angle between the second line segment 95, which extends between the first vertex 82 and the second vertex 84, and a third line segment 105, which extends between the second vertex 84 and the fourth vertex 88. In the illustrated embodiment, a distance 108 between the second bounding point 102 and the second waypoint 106 is greater than or equal to half of the lateral extent of the work vehicle system (e.g., the maximum extent of the work vehicle system along the lateral axis of the work vehicle system). Accordingly, while the work vehicle system is positioned at the second waypoint 106, the work vehicle system does not overlap the restricted region 76. While the second waypoint 106 is laterally and longitudinally offset from the second bounding point 102, the second waypoint may be positioned in other suitable locations in alternative embodiments. For example, the second waypoint may be only laterally offset from the second bounding point, or the second waypoint may be only longitudinally offset from the second bounding point. Once the second waypoint 106 is determined, the controller determines a second updated path (e.g., updated path) that intersects the second waypoint 106. For example, the controller may determine the second updated path by establishing a clothoid curve that extends through the end point 68 of the first swath 70, the starting point 72 of the second swath 74, the first waypoint 96, and the second waypoint 106. The second updated path may be continuous or substantially continuous, and the second updated path may be based on the capabilities of the work vehicle system (e.g., minimum turn radius, etc.).

Figure 5:
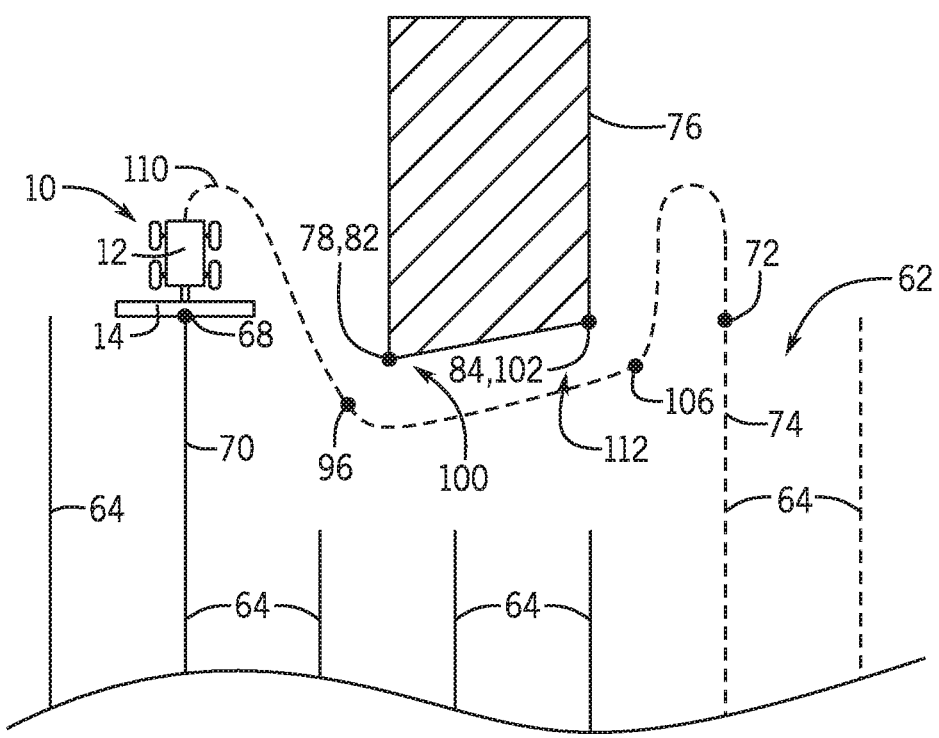
FIG. 5 is a schematic diagram of the autonomous work vehicle system of FIG. 3 within the field, in which a second updated path causes the autonomous work vehicle system to avoid the first portion and a second portion of the restricted region.

FIG. 5 is a schematic diagram of the autonomous work vehicle system 10 of FIG. 3 within the field 62, in which a second updated path 110 (e.g., updated path) causes the autonomous work vehicle system 10 to avoid the first portion 100 and a second portion 112 of the restricted region 76. As illustrated, the second updated path 110 intersects the first waypoint 96, thereby positioning the second updated path 110 a sufficient distance from the first bounding point 78 to enable the work vehicle system 10 to avoid the restricted region 76 at the first bounding point 78. In addition, the second updated path 110 intersects the second waypoint 106, thereby positioning the second updated path 110 a sufficient distance from the second bounding point 102 to enable the work vehicle system 10 to avoid the restricted region 76 at the second bounding point 102. Because the second updated path causes the autonomous work vehicle system to avoid the restricted region, the controller instructs the movement control system of the work vehicle to direct the work vehicle along the second updated path 110, and/or the controller outputs one or more signals indicative of the second updated path (e.g., to another controller configured to provide instructions to direct the work vehicle along the second updated path). However, if another portion of the restricted region 76 were positioned along the second updated path, the controller would repeat the steps disclosed above to establish a third updated path. This process would continue until an updated path that causes the autonomous work vehicle system to avoid the restricted region is established or a maximum number of iterations is reached (e.g., five iterations, etc.). If the maximum number of iterations is reached, the path planning system may inform an operator that the maximum number of iterations is reached. Because the path control system is configured to determine a path that causes the autonomous work vehicle system to avoid the restricted region, the work vehicle may be automatically controlled through a headland turn, thereby increasing the efficiency of agricultural operations (e.g., as compared to manually controlling the work vehicle through the headland turn).

While each of the initial path and the first updated path intersects the boundary of the restricted region at two points, in further embodiments, the initial path and/or the first updated path may intersect the boundary at more than two points (e.g., four points, six points, etc.). In such embodiments, the first reference line segment may connect the first two intersection points closest to the end point of the first swath. Furthermore, while the embodiments disclosed above include a restricted region with four vertices, in alternative embodiments, the restricted region may include more or fewer vertices. In addition, while the initial path and the updated path connect parallel rows through a headland turn in the illustrated embodiment, in further embodiments, the initial/updated path may connect other rows (e.g., perpendicular rows) through other portions of the agricultural operation (e.g., connecting a row of one partition to a row of another partition). Furthermore, in certain embodiments, the restricted region may include multiple portions separated from one another by a gap. For example, an obstacle within the headland may form a first portion of the restricted region, the area of the field covered by swaths may form a second portion of the restricted region, and the first portion and the second portion may be separated from one another by a gap. In such embodiments, the path planning system may be configured to establish an updated path that extends through the gap between the portions of the restricted region. In addition, while agricultural operations are disclosed above, it should be appreciated that the path planning system and method disclosed herein may be utilized for other autonomous work vehicle operations, such as construction operations.

Figure 6:
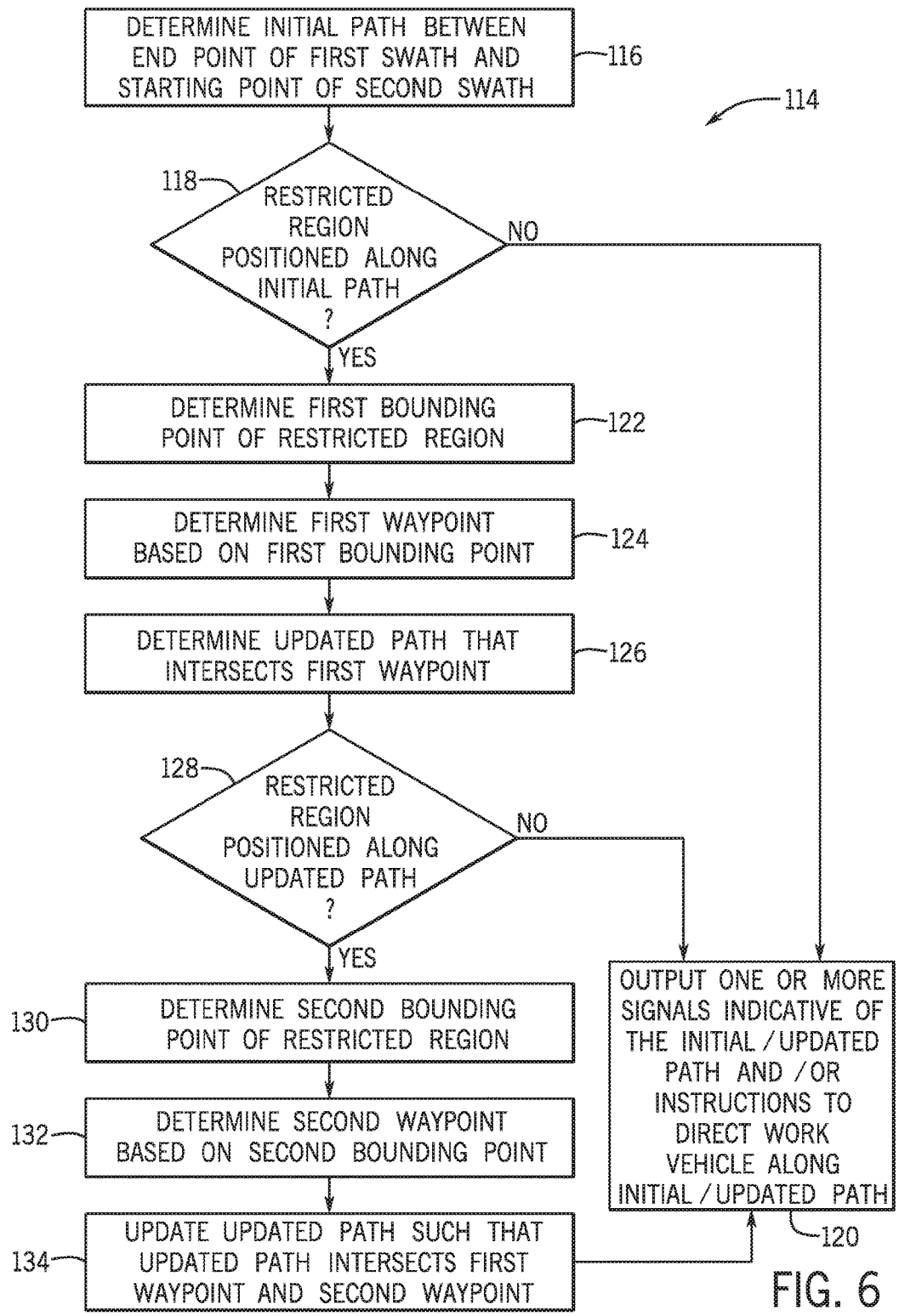
FIG. 6 is a flow diagram of an embodiment of a method for planning a path between an end point of a first swath and a starting point of a second swath.

FIG. 6 is a flow diagram of an embodiment of a method 114 for planning a path between an end point of a first swath and a starting point of a second swath. First, as represented by block 116, an initial path between an end point of a first swath and a starting point of a second swath is determined. For example, the initial path may be determined by establishing a clothoid curve that extends through the end point of the first swath and the starting point of the second swath. Next, a determination is made regarding whether a restricted region is positioned along the initial path, as represented by block 118. If no restricted region is positioned along the initial path, one or more signals indicative of the initial path and/or instructions to direct the work vehicle along the initial path are output, as represented by block 120.

However, in response to identifying the restricted region positioned along the initial path, a first bounding point of the restricted region is determined, as represented by block 122. As previously discussed, the first bounding point corresponds to a location on the boundary of the restricted region having a maximum lateral distance from a first reference line segment, and the first reference line segment connects a first intersection point between the initial path and the boundary of the restricted region to a second intersection point between the initial path and the boundary of the restricted region. For example, the first bounding point may correspond to one vertex of the vertices of the restricted region having a maximum lateral distance from the first reference line segment. In certain embodiments, the first bounding point may only be selected from boundary locations (e.g., vertices) on the same side of the first reference line segment as the first swath and the second swath. Next, as represented by block 124, a first waypoint is determined based on the first bounding point. In certain embodiments, a distance between the first waypoint and the first bounding point is greater than or equal to half of a lateral extent of the work vehicle system. As represented by block 126, an updated path that intersects the first waypoint is then determined. For example, the updated path may be determined by establishing a clothoid curve that extends through the end point of the first swath, the starting point of the second swath, and the first waypoint.

A determination is then made regarding whether the restricted region is positioned along the updated path, as represented by block 128. If the restricted region is not positioned along the updated path, the one or more signals indicative of the updated path and/or instructions to direct the work vehicle along the updated path are output, as represented by block 120. However, in response to identifying the restricted region positioned along the updated path, a second bounding point of the restricted region is determined, as represented by block 130. As previously discussed, the second bounding point corresponds to a location on the boundary of the restricted region having a maximum lateral distance from a second reference line segment, and the second reference line segment connects a first intersection point between the updated path and the boundary of the restricted region to a second intersection point between the updated path and the boundary of the restricted region. For example, the first bounding point may correspond to one vertex of the vertices of the restricted region having a maximum lateral distance from the second reference line segment. In certain embodiments, the second bounding point may only be selected from boundary locations (e.g., vertices) on the same side of the second reference line segment as the first swath and the second swath. Next, as represented by block 132, a second waypoint is determined based on the second bounding point. In certain embodiments, a distance between the second waypoint and the second bounding point is greater than or equal to half of the lateral extent of the work vehicle system. As represented by block 134, the updated path is updated such that the updated path intersects the first waypoint and the second waypoint. For example, the updated path may be determined by establishing a clothoid curve that extends through the end point of the first swath, the starting point of the second swath, the first waypoint, and the second waypoint. In certain embodiments, the steps corresponding to blocks 128-134 are repeated until the restricted region is not positioned along the updated path. One or more signals indicative of the updated path and/or instructions to direct the work vehicle along the updated path are then output, as represented by block 120.

In certain embodiments, the method 114 disclosed above is performed by the work vehicle controller and/or a base station controller. In addition, the steps of the method 114 may be performed in the order disclosed above, or the steps may be performed in a different order. Furthermore, in certain embodiments, certain steps of the method 114 may be omitted.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A path planning system for a work vehicle of a work vehicle system, comprising:
    at least one controller comprising a memory and a processor, wherein the at least one controller is configured to:
        determine a path between an end point of a first swath and a starting point of a second swath;
        perform an iterative process until a stop condition is reached, wherein the iterative process comprising:
            identifying a restricted region positioned along the path;
            determining, in response to identifying the restricted region positioned along the path, a bounding point of the restricted region, wherein the bounding point corresponds to a location on a boundary of the restricted region having a maximum lateral distance from a reference line segment, and the reference line segment connects a first intersection point between the path and the boundary of the restricted region to a second intersection point between the path and the boundary of the restricted region;
            determining only one waypoint of one or more waypoints, wherein the one waypoint is determined based on the bounding point; and
            updating the path to intersect each waypoint of the one or more waypoints; and
        output one or more signals indicative of the path, instructions to direct the work vehicle along the path, or a combination thereof;
        wherein the stop condition comprises determining that the restricted region is not positioned along the path.

2. The path planning system of claim 1, wherein a distance between each waypoint of the one or more waypoints and a respective bounding point is greater than or equal to half of a lateral extent of the work vehicle system.

3. The path planning system of claim 1, wherein the stop condition comprises determining that a maximum number of iterations is reached.

4. The path planning system of claim 1, wherein the bounding point is selected from a plurality of vertices of the restricted region, and the location on the boundary of the restricted region having the maximum lateral distance from the reference line segment corresponds to one vertex of the plurality of vertices having the maximum lateral distance from the reference line segment.

5. The path planning system of claim 4, wherein the first swath and the second swath are positioned on a first lateral side of the reference line segment, and one or more vertices of the plurality of vertices on a second lateral side of the reference line segment, opposite the first lateral side, are excluded from the plurality of vertices while determining the bounding point.

6. The path planning system of claim 1, wherein the at least one controller is configured to output the one or more signals to a movement control system of the work vehicle if the one or more signals are indicative of instructions to direct the work vehicle along the path, and the movement control system comprises a speed control system, a steering control system, or a combination thereof.

7. One or more tangible, non-transitory, machine-readable media comprising instructions configured to cause a processor to:
  determine a path between an end point of a first swath and a starting point of a second swath;
  perform an iterative process until a stop condition is reached, wherein the iterative process comprises:
    identifying a restricted region positioned along the path;
    determining, in response to identifying the restricted region positioned along the path, a bounding point of the restricted region, wherein the bounding point corresponds to a location on a boundary of the restricted region having a maximum lateral distance from a reference line segment, and the reference line segment connects a first intersection point between the path and the boundary of the restricted region to a second intersection point between the path and the boundary of the restricted region;
    determining only one waypoint of one or more waypoints, wherein the one waypoint is determined based on the bounding point; and
    updating the path to intersect each waypoint of the one or more waypoints; and
  output one or more signals indicative of the path, instructions to direct a work vehicle of a work vehicle system along the path, or a combination thereof;
  wherein the stop condition comprises determining that the restricted region is not positioned along the path.

8. The one or more tangible, non-transitory, machine-readable media of claim 7, wherein a distance between each waypoint of the one or more waypoints and a respective bounding point is greater than or equal to half of a lateral extent of the work vehicle system.

9. The one or more tangible, non-transitory, machine-readable media of claim 7, wherein the stop condition comprises determining that a maximum number of iterations is reached.

10. The one or more tangible, non-transitory, machine-readable media of claim 7, wherein the bounding point is selected from a plurality of vertices of the restricted region, and the location on the boundary of the restricted region having the maximum lateral distance from the reference line segment corresponds to one vertex of the plurality of vertices having the maximum lateral distance from the reference line segment.

11. The one or more tangible, non-transitory, machine-readable media of claim 10, wherein the first swath and the second swath are positioned on a first lateral side of the reference line segment, and one or more vertices of the plurality of vertices on a second lateral side of the reference line segment, opposite the first lateral side, are excluded from the plurality of vertices while determining the bounding point.

12. The one or more tangible, non-transitory, machine-readable media of claim 7, wherein the instructions are configured to cause the processor to output the one or more signals to a movement control system of the work vehicle if the one or more signals are indicative of instructions to direct the work vehicle along the path, and the movement control system comprises a speed control system, a steering control system, or a combination thereof.

13. A method for planning a path for a work vehicle of a work vehicle system, comprising:
  determining, via at least one controller, a path between an end point of a first swath and a starting point of a second swath;
  performing, via the at least one controller, an iterative process until a stop condition is reached, wherein the iterative process comprising:
    identifying a restricted region positioned along the path;
    determining a bounding point of the restricted region in response to identifying the restricted region positioned along the path, wherein the bounding point corresponds to a location on a boundary of the restricted region having a maximum lateral distance from a reference line segment, and the reference line segment connects a first intersection point between the path and the boundary of the restricted region to a second intersection point between the path and the boundary of the restricted region;
    determining only one waypoint of one or more waypoint, wherein the one waypoint is determined based on the bounding point; and
    updating the path to intersect each waypoint of the one or more waypoints; and
  outputting, via the at least one controller, one or more signals indicative of the path, instructions to direct the work vehicle along the path, or a combination thereof;
  wherein the stop condition comprises determining that the restricted region is not positioned along the path.

14. The method of claim 13, wherein a distance between each waypoint of the one or more waypoints and a respective bounding point is greater than or equal to half of a lateral extent of the work vehicle system.

15. The method of claim 13, wherein the stop condition comprises determining that a maximum number of iterations is reached.

16. The method of claim 13, wherein the bounding point is selected from a plurality of vertices of the restricted region, and the location on the boundary of the restricted region having the maximum lateral distance from the reference line segment corresponds to one vertex of the plurality of vertices having the maximum lateral distance from the reference line segment.

17. The method of claim 16, wherein the first swath and the second swath are positioned on a first lateral side of the reference line segment, and one or more vertices of the plurality of vertices on a second lateral side of the reference line segment, opposite the first lateral side, are excluded from the plurality of vertices while determining the bounding point.

* * * * *